United States Patent
Chen et al.

(10) Patent No.: US 11,061,567 B2
(45) Date of Patent: Jul. 13, 2021

(54) METHOD AND DEVICE FOR ADAPTIVELY IDENTIFYING TYPE OF FLASH MEMORY

(71) Applicant: RayMX Microelectronics, Corp., Anhui Province (CN)

(72) Inventors: Shuangxi Chen, Jiangsu Province (CN); Cheng Zheng, Suzhou (CN)

(73) Assignee: RAYMX MICROELECTRONICS, CORP., Anhui Province (CN)

( * ) Notice: Subject to any disclaimer, the term of this patent is extended or adjusted under 35 U.S.C. 154(b) by 0 days.

(21) Appl. No.: 16/782,113

(22) Filed: Feb. 5, 2020

(65) Prior Publication Data
US 2021/0124489 A1    Apr. 29, 2021

(30) Foreign Application Priority Data

Oct. 25, 2019 (CN) .......................... 201911023383.3

(51) Int. Cl.
*G06F 13/00*    (2006.01)
*G06F 3/06*    (2006.01)

(52) U.S. Cl.
CPC .......... *G06F 3/0604* (2013.01); *G06F 3/0632* (2013.01); *G06F 3/0659* (2013.01); *G06F 3/0679* (2013.01)

(58) Field of Classification Search
CPC .... G06F 3/0604; G06F 3/0679; G06F 3/0632; G06F 3/065
See application file for complete search history.

(56) References Cited

U.S. PATENT DOCUMENTS 10,169,225 B2 *   1/2019  Chiu ................ G11C 16/10
2004/0199713 A1 * 10/2004  Roohparvar ......... G11C 7/1018
                                                                711/103

(Continued)

FOREIGN PATENT DOCUMENTS

JP    H10198568 A    7/1998
JP     10198568 A *  8/1998

(Continued)

OTHER PUBLICATIONS

"Understanding and selecting higher performance NAND architectures" EE Times by Doug Wong, Dec. 9, 2010 (Year: 2010).*

(Continued)

*Primary Examiner* — Jing-Yih Shyu
(74) *Attorney, Agent, or Firm* — McClure, Qualey & Rodack, LLP

(57) ABSTRACT

A method for adaptively identifying flash memory type includes driving a flash memory interface according to a predetermined configuration and a predetermined protocol of the flash memory interface to send a reading command to a flash memory module to obtain a flash memory identity by successfully reading the flash memory module; changing at least one of the configuration and the interface protocol of the flash memory interface then performing the obtaining the flash memory identity again until all preset adjustments have been tried; and storing the obtained flash memory identity and a firmware corresponding to the obtained flash memory identity to a designated address of a non-volatile memory when the flash memory module is successful read. The above automated method can solve the disadvantages of high cost and low manufacturing flexibility caused by conventional manual identification and re-burning of eFuses.

16 Claims, 4 Drawing Sheets

(56) References Cited

U.S. PATENT DOCUMENTS

| | | | |
|---|---|---|---|
| 2007/0118682 A1* | 5/2007 | Zhang | G06F 13/1694 |
| | | | 711/103 |
| 2008/0164321 A1* | 7/2008 | Lin | G06F 13/385 |
| | | | 235/486 |
| 2008/0195830 A1 | 8/2008 | Lee et al. | |
| 2009/0125790 A1* | 5/2009 | Iyer | G06F 11/1068 |
| | | | 714/773 |
| 2012/0173798 A1* | 7/2012 | Kuan | G06F 11/3051 |
| | | | 711/103 |
| 2016/0155512 A1* | 6/2016 | Ogawa | G11C 7/1066 |
| | | | 365/185.03 |
| 2017/0147499 A1* | 5/2017 | Mohan | G06F 12/10 |

FOREIGN PATENT DOCUMENTS

| | | |
|---|---|---|
| TW | I573146 B | 3/2017 |
| TW | I602194 B | 10/2017 |
| WO | WO-2020015128 A1 * | 1/2020 |

OTHER PUBLICATIONS

Chinese language Office Action dated Jun. 10, 2020, issued in application No. TW 108140749.

* cited by examiner

METHOD AND DEVICE FOR ADAPTIVELY IDENTIFYING TYPE OF FLASH MEMORY

CROSS REFERENCE TO RELATED APPLICATION

This application claims the priority benefit of Chinese Patent Application Serial Number 201911023383.3, filed on Oct. 25, 2019, the full disclosure of which is incorporated herein by reference.

BACKGROUND

Technical Field

The present disclosure relates to the technical field of storage device, and more particularly to a method, a computer readable medium and a device for adaptively identifying flash memory type.

Related Art

Many types of flash memory (e.g., NAND Flash, NOR Flash, . . . etc.) are used in various storage products such as solid-state disks (SSDs), pen-drives, and SD cards. Flash manufacturers include, for example, Intel, Micron, TOSHIBA, SAMSUNG, and HYNIX. The types of flash memory comprise single-level cell (SLC), multi-level cell (MLC), triple-level cell (TLC), and quad-level cell (Quad-level cell, QLC). The specification of the interface of flash memory comprises a single data rate (SDR), double data rate (DDR) (e.g. DDR, DDR2, DDR3, DDR4), etc. Different types of flash memory of different manufacturers support different command formats, and therefore it is required to obtain the specific type of flash memory before correct commands are given for accessing the flash memory and for collecting proper results.

Conventionally, the information such as the manufacturer and category of the flash memory connected to the memory controller in a printed circuit board (PCB) is collected manually before the flash memory is activated. Then the corresponding flash memory identity (ID) is burned into the eFuse in the memory controller, and the corresponding flash firmware (FW) is written into the non-volatile storage space in an integrated circuit (IC) including the memory controller or into the flash memory according to the information of the eFuse after reset to enable the host to access the flash memory and the data in it through firmware running by the main controller in the integrated circuit (IC) after the storage products are manufactured. However, the eFuse is high cost. In addition, the information of the eFuse cannot be erased once it is burned, so the flash memory ID stored in the eFuse is inconsistent with the newly set flash memory after replacing with flash memories of different manufacturers or in different types. The newly set flash memory could not be properly accessed by firmware when the firmware is obtained based on the previous flash memory. The manufacturing process of the storage devices seems to be inflexible that the main control IC used to operate the flash memory must be replaced once the flash memory set on the printed circuit board (PCB) is replaced. Therefore, the embodiments of the present disclosure provide a method, a computer readable medium and a device for adaptively identifying flash memory type intended to solve the issue described above to automatically identify the flash memory type and to automatically store the identified flash memory identity to non-volatile memory. So, the electronic device can write corresponding firmware to non-volatile memory in the main control integrated circuit or a designated address in the flash memory module according to the flash memory identity.

SUMMARY

The embodiments of the present disclosure provide a method for adaptively identifying flash memory type, comprising: driving a flash memory interface in the integrated circuit according to a predetermined configuration and a predetermined interface protocol of the flash memory interface to send a reading command to a flash memory module via the flash memory interface to obtain a flash memory identity by successfully reading the flash memory module, wherein the flash memory interface is coupled to the flash memory module; changing at least one of the configuration and the interface protocol of the flash memory interface then performing the obtaining the flash memory identity again until all preset adjustments have been tried; and storing the obtained flash memory identity and a firmware corresponding to the obtained flash memory identity to a designated address of a non-volatile memory when the flash memory module is successful read by the processor.

The embodiments of the present disclosure further provide a device for adaptively identifying flash memory type, comprising a flash memory interface, a non-volatile memory, and a processor. The flash memory interface coupled to a flash memory module. The processor coupled to the flash memory interface and the non-volatile memory. The processor implements the steps of the method described above when associated program codes are loaded and executed.

The embodiment of the present disclosure could solve the issues of high cost and low manufacturing flexibility caused by manual identifying and re-burning of eFuses through the automated method described above.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
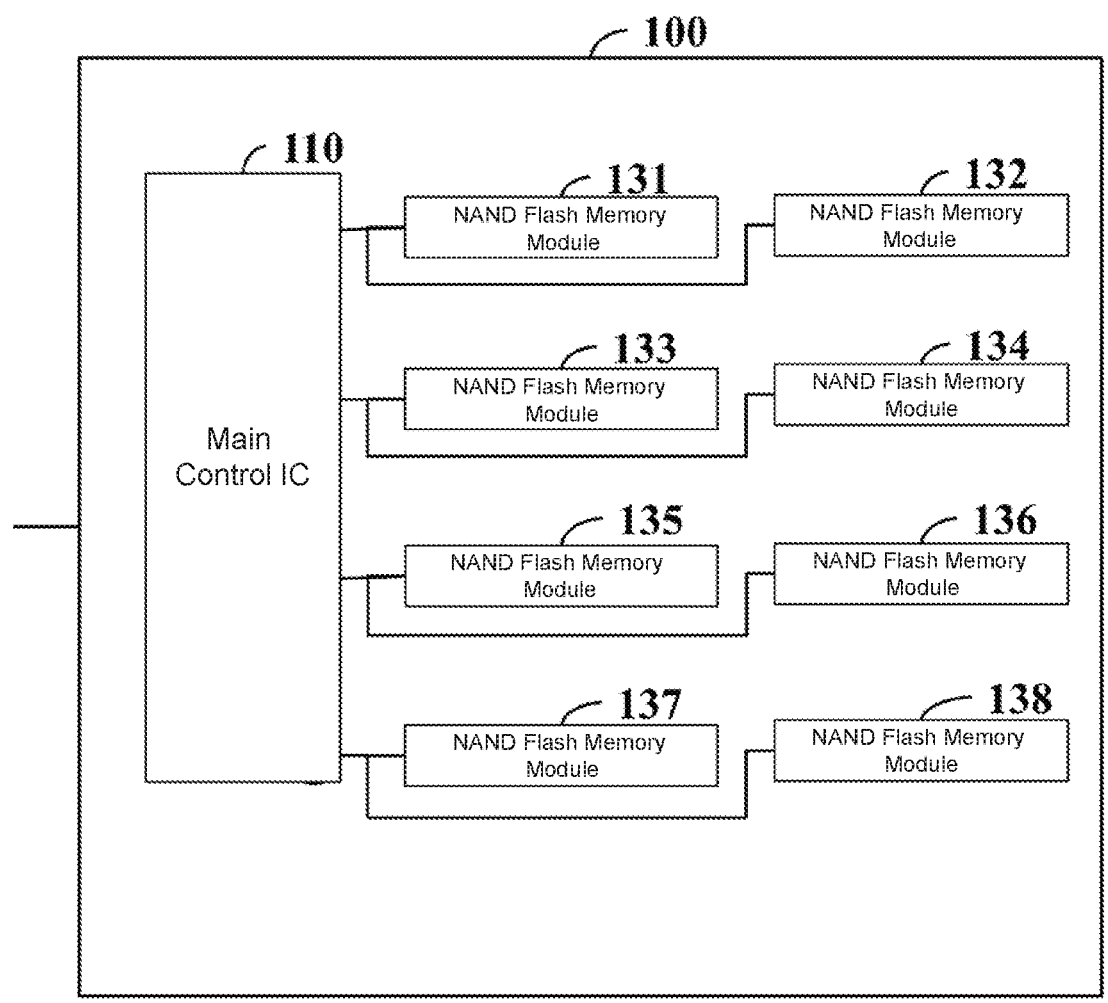
FIG. 1 is a block diagram of a storage device of the embodiment of the present disclosure.

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that comprises a series of elements not only include these elements, but also comprises other elements not specified expressly, or may include inherent elements of the process, method, object, or device. If no more limitations are made, an element limited by "include a/an . . . " does not exclude other same elements existing in the process, the method, the article, or the device which comprises the element.

In the following embodiment, the same reference numerals are used to refer to the same or similar elements throughout the invention.

FIG. 1 is a block diagram of a storage device of the embodiment of the present disclosure. The storage product 100 comprises a main control IC 110 and a plurality of flash memory modules 131 to 138. The storage product 100 may be a solid-state disk (SSD), a pen-drive, and an SD card, etc. The storage product 100 receives and executes commands such as read, write and erase, and related parameters and data through an interface and associated communication protocols of Serial Advanced Technology Attachment (SATA), Peripheral Component Interconnect Express (PCI-E), and Universal Serial Bus (USB).

The main control IC 110 can be connected to a plurality of memory banks. Each memory bank could comprise a plurality of flash memory modules. For example, the first memory bank comprises flash memory modules 131 and 132, the second memory bank comprises flash memory modules 133 and 134, and so on. Thus, the flash memory modules in the same memory bank can share the data line. The main control IC 110 can communicate with the flash memory modules 131 to 138 by Open NAND Flash Interface (ONFI), Toggle or other communication protocols to read data from a specific flash memory module, to write data into a specific flash memory module, or to erase data of a specified physical block in a specific flash memory module. Flash memory modules 131 to 138 can be manufactured by Intel, Micron, Toshiba, Samsung or Hynix, providing a large amount of data storage capabilities, usually gigabytes or even terabytes. Flash memory modules 131 to 138 can be different types of modules, such as single-level cell, multi-level cell, triple-level cell, and quad-level cell. Flash memory modules 131 to 138 can comprise different types of interfaces of single data rate, second generation double data rate, third generation double data rate, etc.

Figure 2:
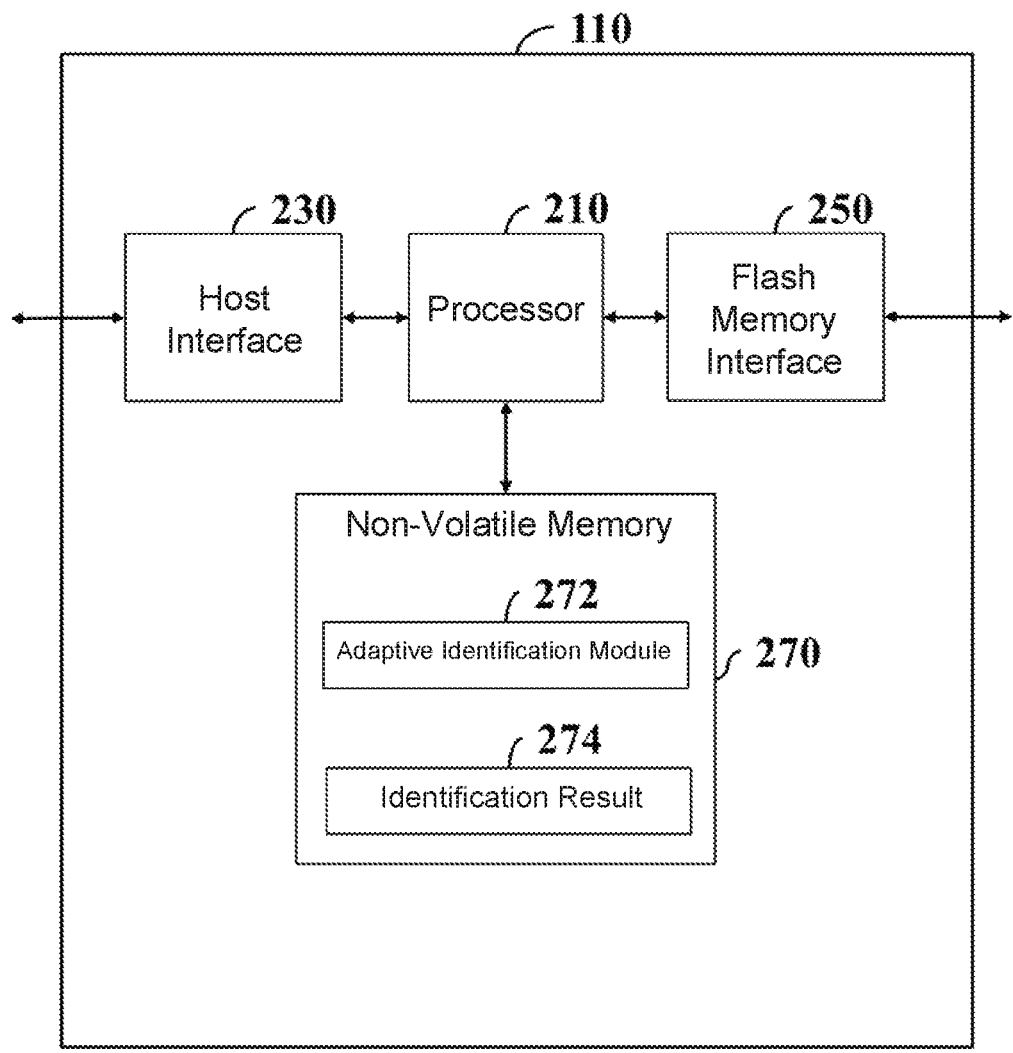
FIG. 2 is a block diagram of a main control IC of the embodiment of the present disclosure.

FIG. 2 is a block diagram of a main control IC of the embodiment of the present disclosure. In some embodiments, the main control IC 110 comprises a processor 210, a host interface 230, a flash memory interface 250, and a non-volatile memory 270. The non-volatile memory 270 could be implemented by a static random access memory (SRAM) to store the program code of the adaptive identification module 272. The processor 210 may be implemented by general-purpose hardware (for example, a controller, an Application Specific Integrated Circuit (ASIC), a single processor, a multi-processor with parallel processing capabilities, a graphics processor, or other computing-capable processors), and to complete the method for adaptively identifying flash memory type described hereafter when the program code of the adaptive identification module 272 is loaded and executed. The non-volatile memory 270 can also be used to store identification results 274, such as the status of memory banks, IDs of flash memory modules 131 to 138, etc. The host interface 230 is coupled to the host. The flash memory interface 250 is coupled to flash memory modules 131 to 138. The processor 210 is coupled to the host interface 230, the flash memory interface 250, and the non-volatile memory 270. The processor 210 could communicate with the host through the host interface 230 and communicate with the flash memory modules 131 to 138 through the flash memory interface 250. The flash memory interface 250 comprises a plurality of registers so that the processor 210 can adjust the physical configurations of the flash memory interface 250 by changing the contents of the registers.

In one aspect, the embodiment of the present invention proposes that the main control IC 110 performs automatic processing to obtain a flash memory ID before the flash memory is successfully activated in order to solve the disadvantages of manual operation and eFuse described above. Since the main control IC 110 does not realize whether there is a flash memory module disposed on the memory module nor the types of the flash memory module at initial, the main control IC 110 executes a method for adaptively identifying the type of flash memory comprising a mechanism similar to the Trial and Error. That is, the processor 210 comprises a plurality of identification modes, and the main control IC 110 sequentially applies different identification modes in order to send reading commands for reading the flash memory ID to one or more of the flash memory modules 131 to 138 until the reading of the flash memory identity is successful. When reading the flash memory identity succeeds, the main control IC 110 learns the type of the flash memory module. In one embodiment, the identification mode comprises flash memory interface configurations and communication protocols. In detail, the processor 210 drives the flash memory interface 250 under a specific configuration to send a reading command to one or more of the flash memory module 131 to 138 to read the flash memory ID using a specific communication protocol when loading and executing the program code of the adaptive identification module 272. The processor 210 changes the configuration of the flash memory interface 250 and/or the communication protocol then performing the reading again until all preset adjustments have been tried when reading the flash memory identity fails. The processor 210 stores the read flash memory identity into a non-volatile memory 270, enabling the electronic device to write corresponding firmware into the designated address of designated physical block in the non-volatile memory 270 or flash memory modules 131 to 138 according to the flash memory ID for activating the flash memory when reading the flash memory identity succeeds. When all preset adjustments are attempted but the flash memory ID has not been successfully read, the error information is fed back to the host or operator for further detection and error elimination operations, or the configuration could be changed to be manually set. The adjustable communication protocols comprise SDR protocol and DDR2 protocol. The adjustable configurations in the flash memory interface comprise the digital voltage (VCCQ) provided to the flash memory modules 131 to 138 and the number of clock cycles of the address information transmitted to the flash memory modules 131 to 138. The details are as follows.

Figure 3:
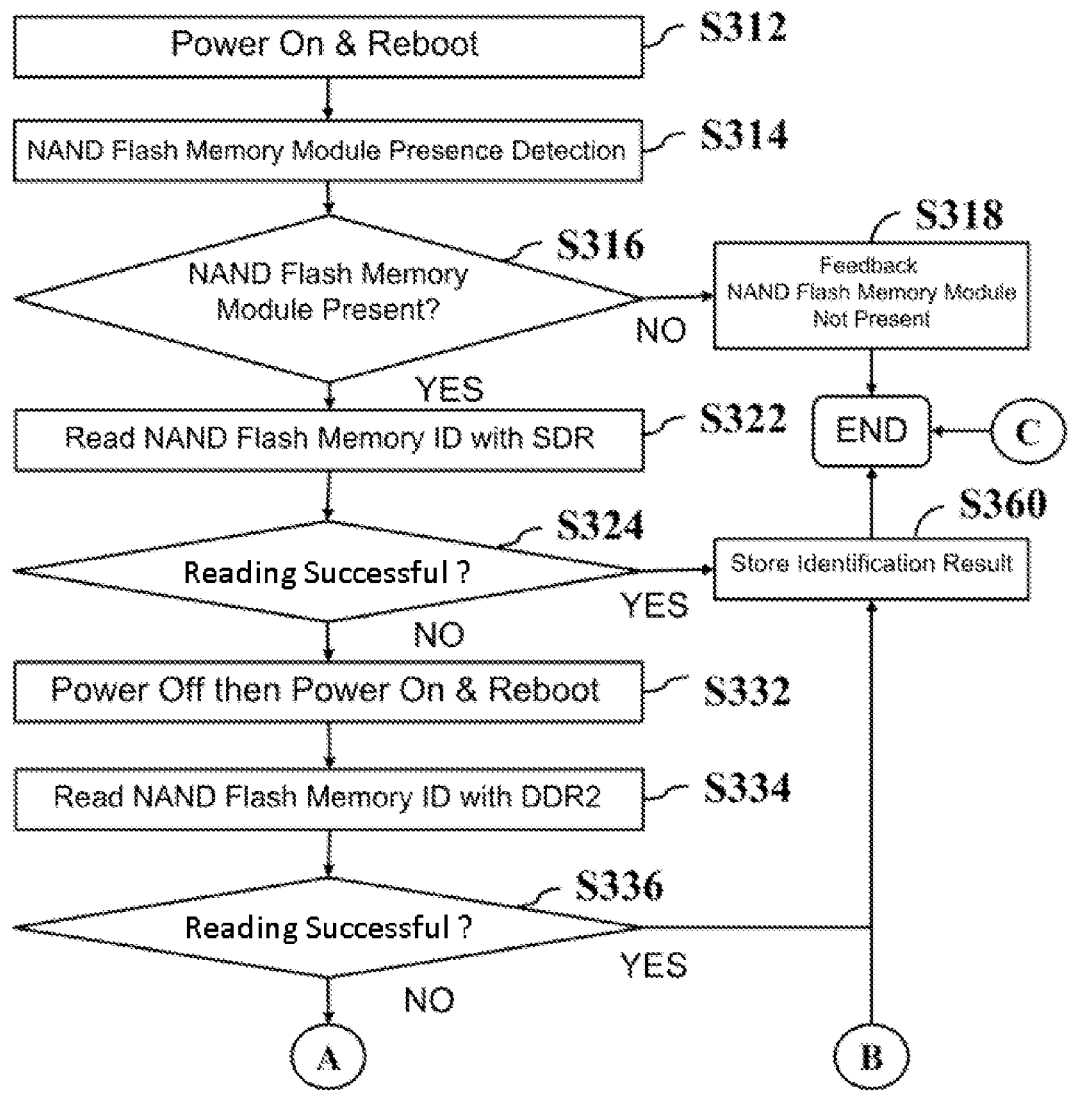
FIG. 3 is a flowchart of a method for adaptively identifying a type of a flash memory of the embodiment of the present disclosure.
Figure 4:
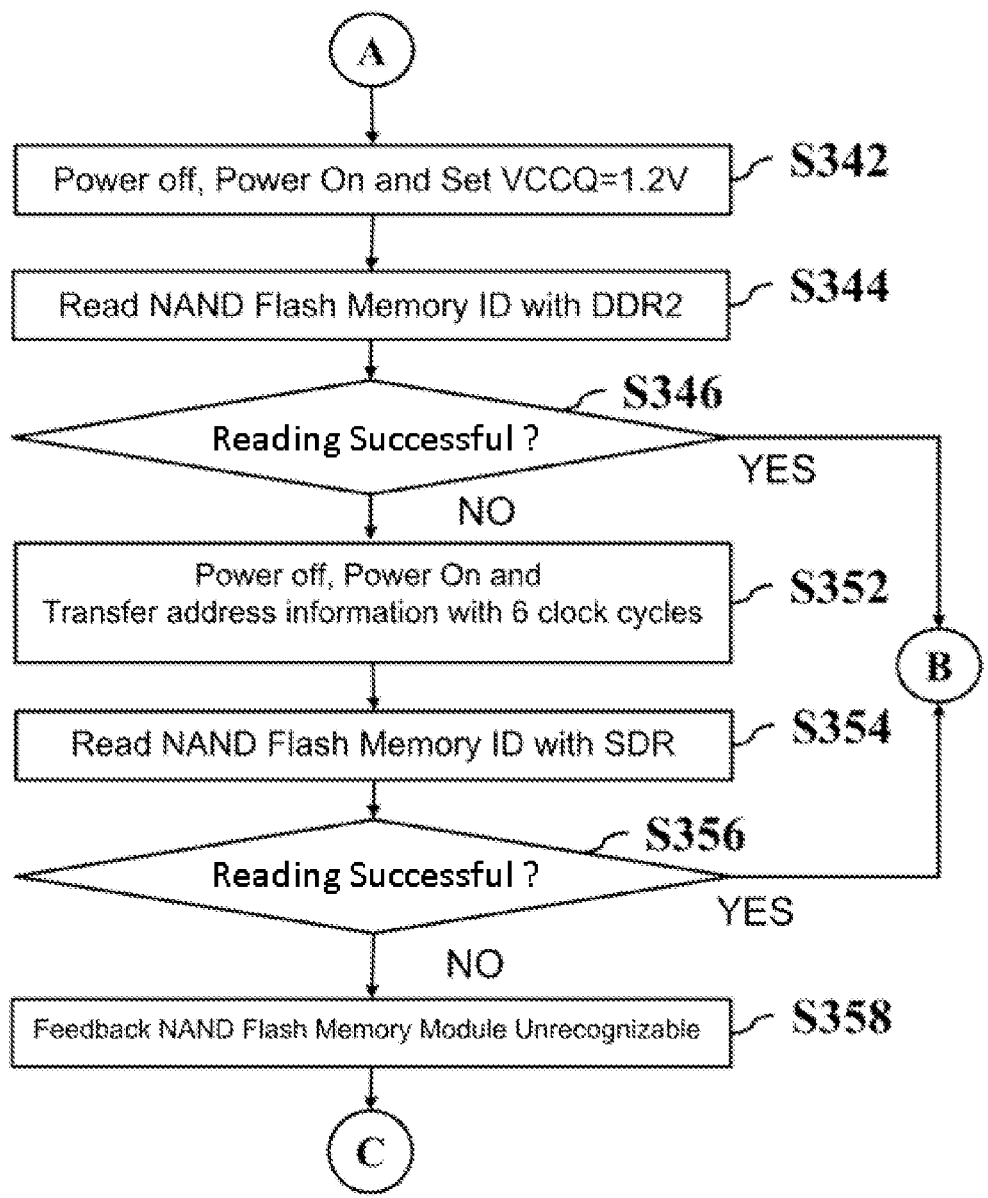
FIG. 4 is a flowchart of a method for adaptively identifying a type of a flash memory of the embodiment of the present disclosure.

The method for the processor 210 loading and executing the program code of the adaptive identification module 272 could refer to the flowcharts shown in FIG. 3 and FIG. 4, and is described in detail as follows:

Step S312: Initially, the storage product 100 is powered on and reset. The processor 210 applies the default identification mode for flash memory type identification.

Step S314: To detect the flash memory module. The processor 210 can drive the flash memory interface 250 to detect the status of each memory bank connected. For example, the flash memory interface 250 can apply a voltage to a specific pin of each memory bank and observe whether there is a response. Once a response is found on a specific memory bank, it is determined that a flash memory module is disposed on the memory bank. For example, if the flash memory interface 250 is connected to 8 memory banks, but only 4 of them are found responding, the processor 210 determines that there are flash memory modules on the 4 memory banks.

Step S316: To determine whether a flash memory module exists in the storage product 100. If yes, proceed to step S322; otherwise, proceed to step S318. When the flash memory interface 250 finds a response in any of the memory banks, the processor 210 determines that a flash memory module exists in the storage product 100.

Step S318: To feedback the non-existing information of the flash memory for launching further detection and error elimination operations. For example, when a flash memory module does not exist in the storage product 100, the flash memory type identification is no longer required. For another example, if there is actually a flash memory module in the storage product 100, but it feedbacks that the flash memory does not exist, it indicates that the storage product 100 needs further testing.

Step S322: The drive flash memory interface 250 send a command to the flash memory module for reading the flash memory ID by the SDR protocol, such as one of the flash memory modules 131 to 138. At this time, the flash memory interface 250 is in a state of default configurations. For example, the VCCQ supplied to the flash memory module is 1.8V, and the address information outputted to the flash memory module is 5 clock cycles.

Step S324: To determine whether the reading of the flash memory identity is successful. If yes, perform the operation of step S360. Otherwise, proceed to step S332. After sending the command, the reading of the flash memory identity is determined to be successful when the processor 210 receives a correct flash memory ID from the specified flash memory module. When reading the flash memory identity succeeds, not only the flash memory ID would be obtained, but the processor 210 also learns that the default configurations of the flash memory interface 250 can normally access the data of the flash memory module by applying the SDR protocol. In other words, the processor 210 also learns the type of flash memory interface 250. Otherwise, if the processor 210 receives an unrecognizable response from the designated flash memory module after the command is sent or fails to get a response at timeout, it indicates that reading the flash memory identity fails.

Step S332: The processor 210 switches to the next identification mode for flash memory type identification, and turns the powers on and restarts the flash memory modules 131 to 138 after power is turned off. There can be a default time interval between power off and power on.

Step S334: The drive flash memory interface 250 uses the DDR2 to send a command for reading the flash memory ID to the flash memory module, such as one of the flash memory modules 131 to 138. At this time, the flash memory interface 250 is in a state of default configurations.

Step S336: To determine whether the reading of the flash memory identity is successful. If yes, perform the operation of step S360. Otherwise, perform the operation of step S342. When the reading the flash memory identity succeeds, the processor 210 not only obtains the flash memory ID but also learns that the default configurations of the flash memory interface 250 can access the data of the flash memory module normally by DDR2. The technical details of this step are similar to step S324, and will not be repeated for brevity herein.

Step S342: To switch the processor 210 to the next identification mode for flash memory type identification, and to power on and set the VCCQ provided to the flash memory modules 131 to 138 to be 1.2V after the flash memory modules 131 to 138 are powered off. There can be a default time interval between power off and power on.

Step S344: The drive flash memory interface 250 send a command for reading the flash memory ID to the flash memory module by DDR2 such as one of the flash memory modules 131 to 138. At this time, the flash memory interface 250 is in an adjusted state.

Step S346: To determine whether the reading of the flash memory identity is successful. If yes, perform the operation of step S360. Otherwise, perform the operation of step S352. When reading the flash memory identity succeeds, the processor 210 not only obtains the flash memory ID but also learns that the adjusted configurations of the flash memory interface 250 can access the data of the flash memory module normally by DDR2. The technical details of this step are similar to step S324, and will not be repeated for brevity herein.

Step S352: To switch the processor 210 to the next identification mode for flash memory type identification, and to power on and set to use 6 clock cycles to transmit address information to the flash memory modules after the flash memory modules 131 to 138 are powered off. There can be a default time interval between power off and power on.

Step S354: The drive flash memory interface 250 send a command for reading the flash memory ID to the flash memory module by SDR such as one of the flash memory modules 131 to 138. At this time, the flash memory interface 250 is in an adjusted state.

Step S356: To determine whether the reading of the flash memory identity is successful. If yes, perform the operation of step S360. Otherwise, perform the operation of step S358. When reading the flash memory identity succeeds, the processor 210 not only obtains the flash memory ID but also learns that the adjusted configurations of the flash memory interface 250 can access the data of the flash memory module normally by SDR. The technical details of this step are similar to step S324, and will not be repeated for brevity herein.

Step S358: To feedback the information that the flash memory cannot be identified to initiate further detection and error elimination operations. For example, to check if the flash memory module is soldered to the memory bank correctly.

Step S360: To store the identification result 274 in the non-volatile memory 270, it could contain the read flash memory ID and configuration parameters of the current flash memory interface 250, etc. So that the host could write the firmware corresponding to the flash memory modules 131 to 138 into the non-volatile memory of the main control IC 110 or designated addresses of designated physical blocks of the flash memory modules 131 to 138 according to the flash memory ID of the non-volatile memory of the main control IC 110 for activation after the main control IC 110 is rebooted.

All or part of the steps in the described method of the present disclosure can be implemented by a calculator program such as the operating system of a computer, drivers for specific hardware of a computer, or software programs. The steps in the described method can also be implemented in other types of programs as shown above. Those skilled in the art may write the method of the embodiments of the present disclosure into a computer program, which will not be described for brevity herein. The programs implemented by the method of the embodiment of the present disclosure can be stored in a suitable computer-readable medium, such as DVD, CD-ROM, USB, hard disk, or can be stored on a web server (for example, the Internet, or other appropriate carriers) accessible via the network.

Although the components described above are included in FIGS. 1 and 2, more additional components can be used to achieve better technical results without violating the spirit of the disclosure. In addition, although the flowcharts of FIG. 3 and FIG. 4 are executed in a specified order, a person skilled in the art can modify the order between these steps on the premise that the same effect is achieved without violating the spirit of the disclosure. Therefore, the present invention is not limited to the sequence described above. Moreover, those skilled in the art can also integrate several steps into one step, or perform more steps sequentially or in parallel to these steps, and the present invention is not limited to this.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method for identifying a flash memory type implemented by a processor in an integrated circuit when a program code is loaded and executed, comprising:

driving a flash memory interface in the integrated circuit according to a predetermined configuration and a predetermined interface protocol of the flash memory interface to send a reading command to a flash memory module via the flash memory interface to obtain a flash memory identity by successfully reading the flash memory module, wherein the flash memory interface is coupled to the flash memory module;

repeatedly changing at least one of a configuration and an interface protocol of the flash memory interface then performing the obtaining the flash memory identity again until either a correct flash memory identify is received or until all preset adjustments have been tried; and storing the obtained flash memory identity and a firmware corresponding to the obtained flash memory identity to a designated address of a non-volatile memory when the flash memory module is successfully read by the processor;

wherein the configuration of the flash memory interface comprise a digital voltage provided to the flash memory module and a number of clock cycles of address information transmitted to the flash memory module.

2. The method according to claim 1, the designated address of the non-volatile memory is in the flash memory module.

3. The method according to claim 1, wherein the non-volatile memory is in the integrated circuit.

4. The method according to claim 1, wherein the interface protocol comprises a single data rate protocol and a second generation double data rate protocol.

5. The method according to claim 1, wherein the digital voltage comprises 1.8 Volt or 1.2 Volt.

6. The method according to claim 1, wherein the number of clock cycles comprises 5 and 6.

7. The method according to claim 1, wherein the method is executed before the flash memory module is successfully activated.

8. A method for identifying a flash memory type implemented by a processor in an integrated circuit when a program code is loaded and executed, comprising:

driving a flash memory interface in the integrated circuit according to a predetermined configuration and a predetermined interface protocol of the flash memory interface to send a reading command to a flash memory module via the flash memory interface to obtain a flash memory identity by successfully reading the flash memory module, wherein the flash memory interface is coupled to the flash memory module;

repeatedly changing at least one of a configuration and an interface protocol of the flash memory interface then performing the obtaining the flash memory identity again until either a correct flash memory identify is received or until all preset adjustments have been tried; and storing the obtained flash memory identity and a firmware corresponding to the obtained flash memory identity to a designated address of a non-volatile memory when the flash memory module is successfully read by the processor;

driving the flash memory interface to detect a state of a plurality of memory banks in the flash memory module; and sending the reading command for obtaining the flash memory identity to the flash memory module when a flash memory module is detected in at least one memory bank.

9. A device for identifying a flash memory type, comprising:

a flash memory interface coupled to a flash memory module;

a non-volatile memory; and a processor coupled to the flash memory interface and the non-volatile memory, configured to drive the flash memory interface according to a predetermined configuration and a predetermined interface protocol of the flash memory interface to send a reading command to the flash memory module via the flash memory interface to obtain a flash memory identity by successfully reading the flash module;

repeatedly adjust at least one of a configuration and an interface protocol of the flash memory interface then performing the obtaining the flash memory identity again until either a correct flash memory identify is received or until all preset adjustments have been tried; and store the obtained flash memory identity and a firmware corresponding to the obtained flash memory identity to a designated address of a non-volatile memory when the flash memory module is successfully read by the processor;

wherein the configuration of the flash memory interface comprise a digital voltage provided to the flash memory module and a number of clock cycles of address information transmitted to the flash memory module.

10. The device according to claim 9, wherein the designated address of the non-volatile memory is in the flash memory module.

11. The device according to claim 9, wherein the non-volatile memory is in the device.

12. The device according to claim 9, wherein the predetermined interface protocol comprises a single data rate protocol and a second generation double data rate protocol.

13. The device according to claim 9, wherein the digital voltage comprises 1.8 Volt and 1.2 Volt.

14. The device according to claim 9, wherein the number of clock cycles comprises 5 and 6.

15. The device according to claim 9, wherein the flash memory identity of the flash memory module is obtained before the flash memory module is activated.

16. The device according to claim 15, wherein the processor configured to activate the flash memory module according to the firmware corresponding to the obtained flash memory identity stored in the non-volatile memory.

* * * * *